United States Patent
Golitschek Edler Von Elbwart et al.

(10) Patent No.: US 7,961,814 B2
(45) Date of Patent: Jun. 14, 2011

(54) METHOD FOR USING A SYMBOL MAPPER USING A SYMBOL MAPPING SCHEME TO GENERATE MODULATION SYMBOLS ACCORDING TO A DIFFERENT SYMBOL MAPPING SCHEME AND A METHOD FOR GENERATING A SYMBOL MAPPING SCHEME

(75) Inventors: Alexander Golitschek Edler Von Elbwart, Darmstadt (DE); Isamu Yoshii, Frankfurt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 568 days.

(21) Appl. No.: 11/993,967

(22) PCT Filed: Jun. 29, 2005

(86) PCT No.: PCT/EP2005/007004
§ 371 (c)(1),
(2), (4) Date: Jun. 30, 2008

(87) PCT Pub. No.: WO2007/000180
PCT Pub. Date: Jan. 4, 2007

(65) Prior Publication Data
US 2008/0267316 A1  Oct. 30, 2008

(51) Int. Cl.
*H04L 27/36* (2006.01)
(52) U.S. Cl. ...................................................... 375/298
(58) Field of Classification Search .......... 375/260–261, 375/265, 295, 298
See application file for complete search history.

(56) References Cited

U.S. PATENT DOCUMENTS

| | | | |
|---|---|---|---|
| 6,195,396 B1 | 2/2001 | Fang | |
| 2003/0072286 A1 | 4/2003 | Kim | |
| 2003/0120990 A1 | 6/2003 | Elbwart | |
| 2004/0181744 A1 | 9/2004 | Sindhushayana | |
| 2005/0226342 A1* | 10/2005 | Alajaji et al. | 375/264 |
| 2007/0002969 A1* | 1/2007 | Jeong et al. | 375/298 |

(Continued)

FOREIGN PATENT DOCUMENTS
EP  0 998 087  5/2000
(Continued)

OTHER PUBLICATIONS
International Search Report dated Feb. 3, 2006.
(Continued)

*Primary Examiner* — Khanh C Tran
(74) *Attorney, Agent, or Firm* — Dickinson Wright PLLC

(57) ABSTRACT

The invention relates to method and apparatus for generating modulation symbols according to a second symbol mapping scheme by a symbol mapping unit being adapted to generate symbols according to a first symbol mapping scheme, wherein the first and second symbol mapping schemes define different mappings of data words of a stream to modulation symbols of a modulation scheme according to the respective symbol mapping scheme. Further, the invention relates to a method and apparatus for generating a mapping of data words to modulation symbols of a square 16 QAM constellation, the modulation symbols being representable by an inphase component and quadrature component. One aspect of the invention is the introduction of a bit sequence transformer unit transforming the data words to be mapped to modulation symbols prior to mapping thereby changing the Hamming distance properties of the mapping. Another aspect of the invention is the generation of a new AICO (Antipodal Inverted COnstellation) mapping scheme.

25 Claims, 9 Drawing Sheets

U.S. PATENT DOCUMENTS

| | | | |
|---|---|---|---|
| 2008/0137763 A1* | 6/2008 | Waters et al. | 375/260 |
| 2008/0192851 A1* | 8/2008 | Golitschek Edler Elbwart et al. | 375/261 |
| 2009/0034635 A1* | 2/2009 | Golitschek Edler Von Elbwart et al. | 375/260 |

FOREIGN PATENT DOCUMENTS

| | | |
|---|---|---|
| GB | 2 334 862 | 9/1999 |
| JP | 2003-515976 | 5/2003 |
| JP | 2003-209588 | 7/2003 |
| WO | 01/39454 | 5/2001 |
| WO | 2004/036817 | 4/2004 |
| WO | 2004/105337 | 12/2004 |
| WO | 2005/032085 | 4/2005 |

OTHER PUBLICATIONS

Japanese Notice of Reasons for Rejection dated Nov. 9, 2010.

* cited by examiner

AICO mapping - Hamming distances

Gray mapping - Hamming distances

US 7,961,814 B2

METHOD FOR USING A SYMBOL MAPPER USING A SYMBOL MAPPING SCHEME TO GENERATE MODULATION SYMBOLS ACCORDING TO A DIFFERENT SYMBOL MAPPING SCHEME AND A METHOD FOR GENERATING A SYMBOL MAPPING SCHEME

FIELD OF THE INVENTION

The invention relates to method and apparatus for generating modulation symbols according to a second symbol mapping scheme by a symbol mapping unit being adapted to generate symbols according to a first symbol mapping scheme, wherein the first and second symbol mapping schemes define different mappings of data words of a stream to modulation symbols of a modulation scheme according to the respective symbol mapping scheme. Further, the invention relates to a method and apparatus for generating a mapping of data words to modulation symbols of a 16 QAM constellation, the modulation symbols being representable by an inphase component and quadrature component.

TECHNICAL BACKGROUND

For a better understanding of the subsequent passages, the definitions of several terms frequently used in the following are provided.

Hamming Weight/Parity

The Hamming weight of a symbol composed of binary elements 0 and 1 (alternatively denoted −1 and 1) is the number of non-zero (i.e. 1) elements within a data word composed of binary elements. Consequently for any 4-bit word that is mapped onto a 16-QAM symbol the Hamming weight can be an integer value of 0 (i.e. for the word "0000"), of 1 (e.g. for the word "0010"), of 2 (e.g. for the word "1010"), of 3 (e.g. for the word "1110"), or of 4 (i.e. for the word "1111"). An even Hamming weight value is also denoted an "even Hamming parity", an odd Hamming weight value is denoted an "odd Hamming parity".

16-QAM

16-QAM (Quadrature Amplitude Modulation) is a digital modulation scheme which is commonly used—for example—in IMT 2000-based mobile communication systems, such as UMTS or CDMA 2000. The 16 modulation symbols are defined by distinct points in the complex signal space in which the 16-QAM constellation is commonly illustrated. Each of these points represents one 16-QAM symbol.

For binary information transmission systems, four different bits may be used to determine one of the existing 16-QAM symbols. Therefore one 16-QAM symbol consists (or can be represented by a data word) of 4 bits, and is represented by a complex value in the complex plane. Generally the complex value of a modulation symbol can be represented by its Cartesian inphase- and quadrature-components (I and Q components) relative to the respective I-axis and Q-axis in the complex plane. These axes also divide the complex plane in four quadrants. The representation of a modulation symbol by its real and imaginary part in the complex plane is equivalent to its representation by polar components, i.e. radius and angle.

In the following a data word that is mapped to a modulation symbol according to Gray 16 QAM will also be denoted by $i_1 q_1 i_2 q_2$. This notation is intended to illustrate the mapping of the individual bits to inphase and quadrature component of the modulation symbol: $i_1$ and $i_2$ together form the inphase component of the symbol, while $q_1$ and $q_2$ together form the quadrature component thereof (or vice versa). Likewise, a data word that is mapped to a modulation symbol according to an AICO 16 QAM mapping (see below) will also be denoted by $a_1 b_1 a_2 b_2$, where $a_1$ and $a_2$ together form the inphase component of the symbol, while $b_1$ and $b_2$ together form the quadrature component thereof (or vice versa).

It should be understood that both notations have been chosen for illustration purposes only and should not be understood as to limit the invention presented to a specific order of mapping the bits of a data word to inphase or quadrature component of a modulation symbol.

Gray Mapping or Gray Coding

Gray mapping or Gray coding are terms that are widely used in communication systems when digital modulation is used. Commonly, the so-called Gray mapping is used to associate the 16 modulation symbols in a 16-QAM constellation with a quadruple of bits which is mapped to the respective symbol. According to this Gray mapping scheme, adjacent modulation symbols in the horizontal or vertical direction differ in one bit only. An exemplary Gray 16-QAM constellation is illustrated in FIG. 21.

AICO mapping

In the copending international patent applications No. PCT/EP 2005/004891 and No. PCT/EP 2005/004892 a new definition of mapping rules of the 16-QAM constellation, a so-called AICO (Antipodal Inverted COnstellation) mapping, has been proposed. An exemplary 16-QAM symbol constellation according to this new proposed mapping scheme is illustrated in FIG. 22. As some embodiments of the invention will relate to this new mapping of modulation symbols, the key properties of AICO mapping will be briefly explained in the following.

FIG. 3 shows a mapping of even and odd Hamming weight words onto constellation symbols according to an AICO mapping scheme. In the constellation shown in FIG. 3, a special 16-QAM mapping fulfils at least the following properties:

All words that have a first Hamming weight parity (even/odd) are unambiguously mapped either onto the dashed or the white modulation symbols in FIG. 3.

All words that have a second Hamming weight parity (odd/even) are unambiguously mapped either onto the dashed or the white modulation symbols in FIG. 3.

The above two properties are complementary to each other, i.e. if the even Hamming weight words are mapped onto the dashed modulation symbols, then the odd Hamming weight words are mapped onto the white modulation symbols, or vice versa Rotation of a first constellation symbol by 180 degrees results in a second constellation symbol that conveys a second word that is the binary complement of the first word that is conveyed by the first constellation symbol.

FIG. 3 further illustrates a common denotation of distances within a square 16 QAM constellation, where modulation symbols closest to the axis of a complex coordinate plane have a Euclidian distance of d from the axis (resulting in an Euclidian distance of $2d=2\sqrt{D}$ between nearest neighbor symbols).

As can be seen in FIG. 4, each dashed symbol in a 16-QAM constellation as in FIG. 3 has either two or four nearest neighbor symbols, and each white symbol in FIG. 3 has three nearest neighbor symbols. Therefore the first two properties above may be reformulated as follows:

All words that have a first Hamming weight parity are unambiguously mapped either onto modulation symbols with two nearest neighbors or with four nearest neighbors.

All words that have a second Hamming weight parity are unambiguously mapped onto modulation symbols with three nearest neighbors.

A noteworthy consequence of these properties is that the Gray principle for closest neighboring symbols is violated in some cases. Therefore the proposed mapping may be denoted a non-Gray mapping.

The last property of the four properties defined above states that antipodal constellation symbols carry words that are binary inverted. Therefore this mapping is referred to as Antipodal Inverted Constellation Mapping. A consequence of the non-Gray characteristic is the difference of symbol regions which specific bits select.

As has been described in the two co-pending European applications mentioned above, AICO mapping may be advantageously employed for communications and allows for providing a modulation and coding scheme using a signal space expansion and 16-QAM which improves the bit-error rate in comparison to QPSK modulated signals. As far as mobile communication systems are concerned, AICO mapping further provides the possibility to implement coders and decoders with low complexity.

It is also desirable to have a simple mapping structure in a system that can be used to generate modulation symbols from bits according to the Gray mapping rules as well as according to the AICO mapping rules, without having to rely on a hardware implementation of both sets of mapping rules in parallel. This is mainly for complexity reasons, and also to allow an easy inclusion of the AICO mapping rules into legacy devices that support only the generation of modulation symbols according to Gray mapping rules. Likewise in new systems that support only the generation of modulation symbols according to AICO mapping rules, it may be desirable to be able to generate modulation symbols according to Gray mapping rules.

In the prior-art several approaches have been proposed to implement different mapping schemes.

For example, in US2003/72286A1 proposes a transmitting/receiving apparatus and method for packet retransmission in a mobile communication system. Upon request for a retransmission from a receiver, a transmitter inverts initially transmitted coded bits if the retransmission is odd-numbered for the same data, modulates the inverted bits, and transmits the modulated bits to the receiver. Then the receiver recovers the coded bits by demodulation. If the coded bits are retransmitted an odd number of times, the receiver decodes the coded bits after inversion. Thus the error probabilities of initial transmission bits and retransmission bits are averaged in effect and decoding performance is improved.

In WO 2004/036817A1, another application of the applicant, a method of transmitting data in a wireless communication system from a transmitter to a receiver comprising the steps of modulating data at the transmitter using a first signal constellation pattern to obtain a first data symbol. The first data symbol is transmitted to the receiver using a first diversity branch. Further, the data is modulated at the transmitter using a second signal constellation pattern to obtain a second data symbol. Then, the second data symbol is transmitted to the receiver over a second diversity branch. Finally, the received first and second data symbol are diversity combined at the receiver.

Though these prior-art examples show how different symbol mappings may be implemented using a single mapping unit working according to a given symbol mapping scheme, the use of these techniques to allow for providing both AICO mapping and Gray mapping will fail. In these prior-art techniques it is not possible to change the underlying Hamming distance structure of the mapping, i.e. to change the nearest-neighbor relations (Hamming distances) of the modulation symbols in the constellation.

Therefore it is not possible to generate an AICO mapping with a Gray symbol mapping unit (or vice versa) using the prior-art techniques, since the AICO mapping and Gray mapping scheme have different distributions with respect to the Hamming distance of data words representing nearest neighbors in a representation of the constellation of the modulation symbols of the modulation scheme.

SUMMARY OF THE INVENTION

It is therefore the object of the invention to convert data sequences of bits into modulation symbols according to a certain modulation method.

It is another object of the invention to provide a technique for allowing the generation of different symbols mapping using a symbol mapping unit being adapted to generate modulation symbols according to a given symbol mapping scheme.

With respect to the solution of this object, one of the main aspects of the invention is the introduction of a bit sequence transformer unit prior to symbol mapping to modify the bit sequences prior to modulation. According to an exemplary embodiment, the bit sequence transformer unit may employ binary logical exclusive-or (XOR) operations, and optionally one or more binary logical negation units.

Another object of the invention is to provide a method for generating an AICO symbol constellation fulfilling the AICO mapping rules.

According to one embodiment of the invention, a method for generating modulation symbols according to a second symbol mapping scheme by a symbol mapping unit being adapted to generate symbols according to a first symbol mapping scheme is provided. The first and second symbol mapping schemes define different mappings of data words of a stream to modulation symbols of a modulation scheme according to the respective symbol mapping scheme. According to the embodiment, a stream of data words is provided to a bit sequence transformer unit. The number of bits of a data word is given by the order of the modulation scheme.

The bit sequence transformer unit transforms the data words to output a stream of transformed data words, which are mapped to modulation symbols according to a first symbol mapping scheme by the symbol mapping unit.

Thereby, the mapping of the transformed data words of the stream according to the first symbol mapping scheme results in modulation symbols according to the mapping of the data words of the provided stream prior to transformation according to the second symbol mapping scheme. Further, the first and the second symbol mapping scheme have different distributions with respect to the Hamming distance of data words representing nearest neighbors in a representation of the constellation of the modulation symbols of the modulation scheme.

In a further exemplary embodiment of the invention the transformation of the sequence of the data words within the stream by the bit sequence transformer unit comprises performing at least one logical operation on at least one bit of each of the data words of the stream prior to mapping.

In another embodiment of the invention, the at least one logical operation modifies the at least one bit of a respective data word to be mapped to a modulation symbol by combining the at least one bit of the respective data word with at least one other bit of the respective data word.

A further embodiment of the invention relates to the use of 16 QAM modulations. In this embodiment the first and second symbol mapping scheme each define a mapping of data words of 4 bits to modulation symbols of a 16 QAM constellation. In a variation of this embodiment, the 16 QAM constellation has 16 modulation symbols representable in four rows and four columns in a complex coordinate plane, each modulation symbol of the 16-QAM constellations being representable by a data word being a combination of four data bits. One of the two symbol mapping schemes is a symbol mapping scheme obeying the following mapping rules of data words to modulation symbols:

- a first one of the four data bits of a data word representing a modulation symbol selects one of two horizontal contiguous symbol regions of the 16-QAM constellation based on its logical value, each of the two horizontal contiguous symbol regions being formed by two rows adjacent to each other,
- a second one of the four data bits of the data word representing the respective modulation symbol selects one of two vertical contiguous symbol regions of the 16-QAM constellation based on its logical value, each of the two vertical contiguous symbol regions being formed by two columns adjacent to each other,
- a third one of the four data bits of the data word representing the respective modulation symbol selects one of two horizontal non-contiguous symbol regions of the 16-QAM constellation based on its logical value, each of the two horizontal non-contiguous symbol regions being formed by two rows not adjacent to each other,
- a fourth one of the four data bits of the data word representing the respective modulation symbol selects one of two vertical non-contiguous symbol regions of the 16-QAM constellation based on its logical value, each of the two vertical non-contiguous symbol regions being formed by two columns not adjacent to each other.

Further, the other symbol mapping scheme may be a Gray symbol mapping scheme.

In another variation of this embodiment of the invention, the transformation of the data words of the stream is performed as follows:

- the bit in each data word of the provided stream selecting the horizontal non-contiguous symbol region according to the second symbol mapping scheme is combined with the bit in the respective data word of the provided stream selecting the horizontal contiguous symbol region according to the second symbol mapping scheme, and
- the bit in each data word of the provided stream selecting the vertical non-contiguous symbol region according to the second symbol mapping scheme is combined with the bit in the respective data word of the provided stream selecting the vertical contiguous symbol region according to the second symbol mapping scheme.

In another variation of the embodiment the Gray symbol mapping scheme obeys the following mapping rules of data words to modulation symbols:

- a first one of the four data bits of a data word representing a modulation symbol selects one of two horizontal contiguous symbol regions of the 16-QAM constellation based on its logical value, each of the two horizontal contiguous symbol regions being formed by two rows adjacent to each other,
- a second one of the four data bits of the data word representing the respective modulation symbol selects one of two vertical contiguous symbol regions of the 16-QAM constellation based on its logical value, each of the two vertical contiguous symbol regions being formed by two columns adjacent to each other,
- a third one of the four data bits of the data word representing the respective modulation symbol selects one of two horizontal symbol regions of the 16-QAM constellation based on its logical value, wherein one of the two horizontal symbol regions is formed by two rows not adjacent to each other, and the other one of the two horizontal symbol regions is formed by two rows adjacent to each other,
- a fourth one of the four data bits of the data word representing the respective modulation symbol selects one of two vertical symbol regions of the 16-QAM constellation based on its logical value, wherein one of the two vertical symbol regions is formed by two columns not adjacent to each other, and the other one of the two vertical symbol regions is formed by two columns adjacent to each other.

In this variation, the transformation of the data words of the stream is performed as follows:

- the bit in each data word of the provided stream selecting the horizontal symbol region according to the second symbol mapping scheme is combined with the bit in the respective data word of the provided stream selecting the horizontal contiguous symbol region according to the second symbol mapping scheme, and
- the bit in each data word of the provided stream selecting the vertical symbol region according to the second symbol mapping scheme is combined with the bit in the respective data word of the provided stream selecting the vertical contiguous symbol region according to the second symbol mapping scheme.

According to another embodiment of the invention, the combination used to transform the data words is a XOR combination of the respective two bits.

The method may further comprise the step of inverting at least one of the data bits of the provided or transformed data words prior to passing them to the symbol mapping unit, if necessary.

A further embodiment of the invention provides a transmission apparatus for generating modulation symbols according to a second symbol mapping scheme by a symbol mapping unit being adapted to generate symbols according to a first symbol mapping scheme. Again, the first and second symbol mapping schemes define different mappings of data words of a stream to modulation symbols of a modulation scheme according to the respective symbol mapping scheme.

The transmission apparatus may for example comprise a data source for providing a stream of data words to a bit sequence transformer unit, wherein the number of bits within a data word is given by the order of the modulation scheme.

Moreover, the apparatus may comprise a processing unit for transforming the data words by the bit sequence transformer unit to output a stream of transformed data words, and the symbol mapping unit for mapping the transformed data words of the stream to modulation symbols according to a first symbol mapping scheme.

According to this embodiment, the transmission apparatus is adapted to map the transformed data words of the stream according to the first symbol mapping scheme. This mapping produces modulation symbols according to the mapping of the data words of the provided stream according to the second mapping scheme. Further, first and the second symbol mapping scheme have different distributions with respect to the Hamming distance of data words representing nearest neighbors in a representation of the constellation of the modulation symbols of the modulation scheme.

The apparatus may comprise means allowing the apparatus to perform the individual steps of the method according to one of the different embodiments and variations thereof described above.

In another embodiment of the invention, the apparatus may comprise a configuration means for configuring the bit sequence transformer unit to transform or to not transform the provided data words prior to symbol mapping by the symbol mapping unit.

In a variation the apparatus may also comprise a receiver for receiving a control signal comprising information indicating whether to transform provided data words prior to symbol mapping by the symbol mapping unit. In this variation the configuration means may be adapted to configure the bit sequence transformer unit according to the information of the control signal.

Another embodiment of the invention provides a computer-readable medium storing instructions that, when executed by a processor of a transmission apparatus, cause the transmission apparatus to generate modulation symbols according to a second symbol mapping scheme. The transmission apparatus may comprise a symbol mapping unit that is adapted to generate symbols according to a first symbol mapping scheme. The first and second symbol mapping schemes define different mappings of data words of a stream to modulation symbols of a modulation scheme according to the respective symbol mapping scheme.

The apparatus may be caused to generate modulation symbols according to a second symbol mapping scheme by providing a stream of data words to a bit sequence transformer unit, wherein the number of bits within a data word is given by the order of the modulation scheme, transforming the data words by the bit sequence transformer unit to output a stream of transformed data words, and mapping the transformed data words of the stream to modulation symbols according to a first symbol mapping scheme by the symbol mapping unit. Thereby, the mapping of the transformed data words of the stream according to the first symbol mapping scheme results in modulation symbols according to the mapping of the data words of the provided stream according to the second symbol mapping scheme and the first and the second symbol mapping scheme have different distributions with respect to the Hamming distance of data words representing nearest neighbors in a representation of the constellation of the modulation symbols of the modulation scheme.

In a further embodiment of the invention, the computer-readable medium may store instructions that, when executed by the transmission apparatus, cause the transmission apparatus to perform the steps of the method according to one of the various embodiments and variations thereof described above.

Another embodiment of the invention relates to a method for generating a mapping of data words to modulation symbols of a 16 QAM constellation, the modulation symbols being representable by an inphase component and quadrature component. According to this embodiment, the numerical value of a first one and the numerical value of a third one of the quadruple of bits may be weighted by a first factor. Further, the numerical value of a second one and the numerical value of a fourth one of the quadruple of bits may be weighted by a second factor, wherein the first factor is equal to two times the second factor.

The weighted numerical value of the first one of the quadruple of bits and the weighted numerical value of the second one of the quadruple of bits may be added, thereby forming the inphase component of a modulation symbol of the 16 QAM constellation. Also the weighted numerical value of the third one of the quadruple of bits and the weighted numerical value of the fourth one of the quadruple of bits may be added, thereby forming the quadrature component of a modulation symbol of the 16 QAM constellation.

In a further embodiment of the invention, the first factor is equal to two times the minimum distance d between modulation symbols being nearest neighbors in the 16 QAM constellation and the second factor is equal to the minimum distance d.

Another embodiment of the invention relates to an alternative method for generating a mapping of data words to modulation symbols of a 16 QAM constellation. Again, the modulation symbols can be represented by an inphase component and quadrature component. The method comprises weighting the numerical value of a first one and the numerical value of a third one of the quadruple of bits with a first factor, adding the weighted numerical value of the first one of the quadruple of bits and a numerical value of the second one of the quadruple of bits, and weighting the sum of the numerical values of the weighted first one and the second one of the quadruple of bits by a second factor, thereby forming the inphase component of a modulation symbol of the 16 QAM constellation, and adding the weighted numerical value of the third one of the quadruple of bits and a numerical value of a fourth one of the quadruple of bits, and weighting the sum of the numerical values of the weighted third one and the fourth one of the quadruple of bits by the second factor, thereby forming the quadrature component of a modulation symbol of the 16 QAM constellation.

In a variation of the embodiment, the first factor is equal to two and the second factor is equal to the minimum distance d between modulation symbols being nearest neighbors in the 16 QAM constellation.

Both alternative methods for generating a mapping of data words to modulation symbols of a 16 QAM constellation may optionally further comprise the step of converting each of a quadruple in bits from a logical value to a numerical value.

Further, another embodiment of the invention relates to an apparatus for generating a mapping of data words to modulation symbols of a 16 QAM constellation, the modulation symbols being representable by an inphase component and quadrature component. The apparatus may comprise weighting means for weighting the numerical value of a first one and the numerical value of a third one of the quadruple of bits with a first factor, and for weighting the numerical value of a second one and the numerical value of a fourth one of the quadruple of bits with a second factor, wherein the first factor is equal to two times the second factor.

Further, the apparatus may comprise at least one adder for adding the weighted numerical value of the first one of the quadruple of bits and the weighted numerical value of the second one of the quadruple of bits, thereby forming the inphase component of a modulation symbol of the 16 QAM constellation and for adding the weighted numerical value of the third one of the quadruple of bits and the weighted numerical value of the fourth one of the quadruple of bits, thereby forming the quadrature component of a modulation symbol of the 16 QAM constellation.

In a further embodiment, the first factor is equal to two times the minimum distance d between modulation symbols being nearest neighbors in the 16 QAM constellation and the second factor is equal to the minimum distance d.

Another embodiment provides another apparatus for generating a mapping of data words to modulation symbols of a 16 QAM constellation, the modulation symbols being representable by an inphase component and quadrature component. This apparatus may comprise weighting means for weighting the numerical value of a first one and the numerical value of a third one of the quadruple of bits with a first factor, and at least one adder for adding the weighted numerical value of the first one of the quadruple of bits and a numerical value of the second one of the quadruple of bits, and weighting the sum of the numerical values of the weighted first one and the second one of the quadruple of bits by a second factor, thereby forming the inphase component of a modulation symbol of the 16 QAM constellation, and for adding the weighted numerical value of the third one of the quadruple of bits and a numerical value of a fourth one of the quadruple of bits, and weighting the sum of the numerical values of the weighted third one and the fourth one of the quadruple of bits by the second factor, thereby forming the quadrature component of a modulation symbol of the 16 QAM constellation.

According to a variation of this embodiment, the first factor is equal to two and the second factor is equal to the minimum distance d between modulation symbols being nearest neighbors in the 16 QAM constellation.

A further embodiment of the invention relates to a computer-readable medium storing instructions that, when executed by a processor of a transmitting apparatus, causes the transmitting apparatus to generate a mapping of data words to modulation symbols of a 16 QAM constellation, the modulation symbols being representable by an inphase component and quadrature component.

The transmitting apparatus may be cause to generate a mapping of data words to modulation symbols by weighting the numerical value of a first one and the numerical value of a third one of the quadruple of bits with a first factor, weighting the numerical value of a second one and the numerical value of a fourth one of the quadruple of bits with a second factor, wherein the first factor is equal to two times the second factor, adding the weighted numerical value of the first one of the quadruple of bits and the weighted numerical value of the second one of the quadruple of bits, thereby forming the inphase component of a modulation symbol of the 16 QAM constellation and adding the weighted numerical value of the third one of the quadruple of bits and the weighted numerical value of the fourth one of the quadruple of bits, thereby forming the quadrature component of a modulation symbol of the 16 QAM constellation.

A further embodiment of the invention provides another computer-readable medium storing instructions that, when executed by a processor of a transmitting apparatus, causes the transmitting apparatus to generate a mapping of data words to modulation symbols of a 16 QAM constellation, the modulation symbols being representable by an inphase component and quadrature component.

According to this embodiment the apparatus may be caused to generate a mapping of data words to modulation symbols by weighting the numerical value of a first one and the numerical value of a third one of the quadruple of bits with a first factor, adding the weighted numerical value of the first one of the quadruple of bits and a numerical value of the second one of the quadruple of bits, and weighting the sum of the numerical values of the weighted first one and the second one of the quadruple of bits by a second factor, thereby forming the inphase component of a modulation symbol of the 16 QAM constellation, and adding the weighted numerical value of the third one of the quadruple of bits and a numerical value of a fourth one of the quadruple of bits, and weighting the sum of the numerical values of the weighted third one and the fourth one of the quadruple of bits by the second factor, thereby forming the quadrature component of a modulation symbol of the 16 QAM constellation.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

The following paragraphs will describe various embodiments of the present invention. For exemplary purposes only, most of the embodiments are outlined independent from their implementation in a mobile environment. However, it is to be noted that the invention may be especially applicable to wireless or mobile networks, such as UMTS communication systems, WLANs, etc.

Also the explanations given in the Technical Background section above are merely intended to better understand the exemplary embodiments described in the following and should not be understood as limiting the present invention to the described specific implementations of processes and functions in a mobile communication network.

Figure 1:
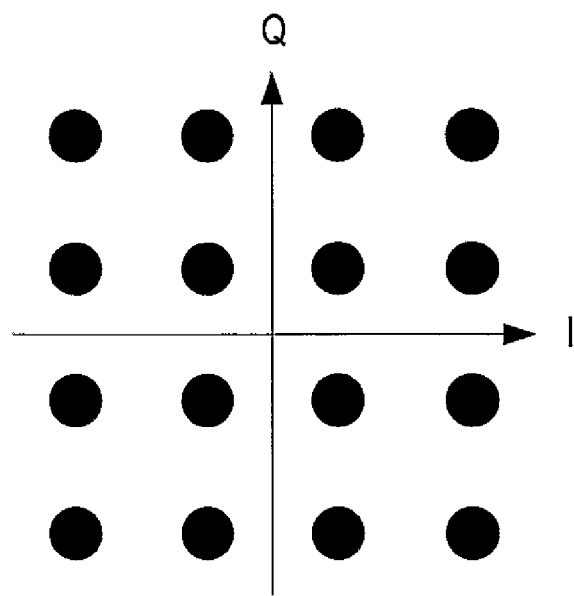
FIGS. 1 and 2 show two exemplary square 16 QAM constellations.
Figure 2:
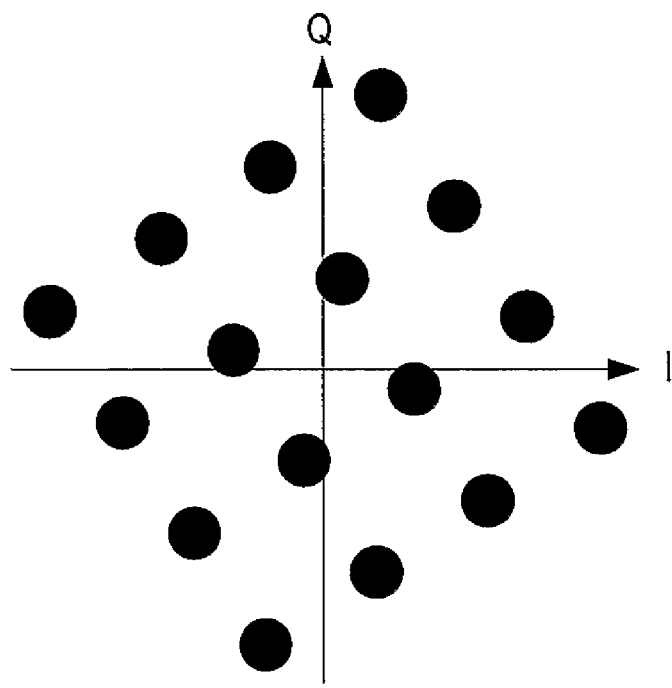

For exemplary purposes only, a specific constellation of the 16-QAM symbols, where the signal points within a quadrant of the complex plane are arranged such that they form a square of four points in two orthogonal directions of the signal space is assumed in the following. This mapping is commonly known as square 16-QAM or lattice 16-QAM. Two examples of square 16-QAM constellations are given in FIG. 1 and FIG. 2. It should be apparent to the skilled person that for each rotated 16-QAM constellation as for example shown in FIG. 2, the axes of the complex plane may be chosen such that the rotated 16-QAM constellation can be viewed as in FIG. 1.

Though the invention will be described with respect to square 16-QAM constellation, the invention is not to be limited to the use of this modulation. As will become apparent to the skilled person from the description of the invention herein, the invention may also be advantageously employed with higher order modulation schemes such as 64QAM.

Figure 5:
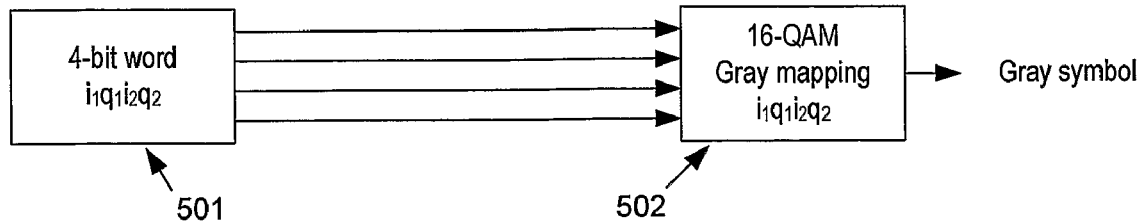
FIGS. 5 and 6 show exemplary prior art structures of two different modulation units.
Figure 6:
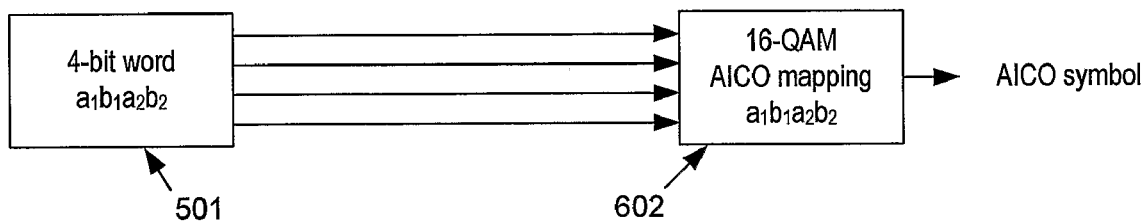

In FIG. 5 and FIG. 6 prior art structures of two different modulation units are shown. In each of the different structures, a data source 501 provides a stream of bits, wherein the bits are to be mapped block-wise to modulation symbols in the respective mapping units 502, 602. The number of bits mapped to a modulation symbol is referred to as a data word herein and depends on the order of the modulation scheme used. For exemplary purposes the bits of the data words are denoted $i_1 q_1 i_2 q_2$ if the mapping unit 502 employs a Gray symbol mapping scheme. Thereby, the components $i_1$ and $i_2$ define the inphase components of the modulation symbols, while the components $q_1$ and $q_2$ define the quadrature components of the modulation symbols. When employing an AICO mapping unit 602, the bits in a data word to be mapped to a modulation symbol are referred to as $a_1 b_1 a_2 b_2$ to indicate for the difference in the mapping units employed. The function of the bits $a_1 b_1 a_2 b_2$ is similar to the one in the representation $i_1 q_1 i_2 q_2$.

As in the examples shown in FIGS. 5 and 6 a data source 501 provides a stream of bits to be mapped to modulation symbols in the respective mapping units 502, 602. The data source 501 may for example provide the data bits in a stream of data words, wherein the number of bits in a data word is chosen based on the order of the modulation scheme. For example, when employing 16-QAM a data word consists of 4 data bits each. The data source 501 may be, for example, a coder (such as a convolutional coder, a turbo coder, etc.) or any arbitrary data stream from multimedia services, voice communications, application data, etc.

If a device has to support both Gray and AICO mapping, it is undesirable to realize both structures in parallel within a transmitting device. According to an embodiment of the invention, the structure of FIG. 5 is substituted by a structure like in FIG. 7, or alternatively the structure of FIG. 6 by a structure as shown in FIG. 8.

Figure 7:
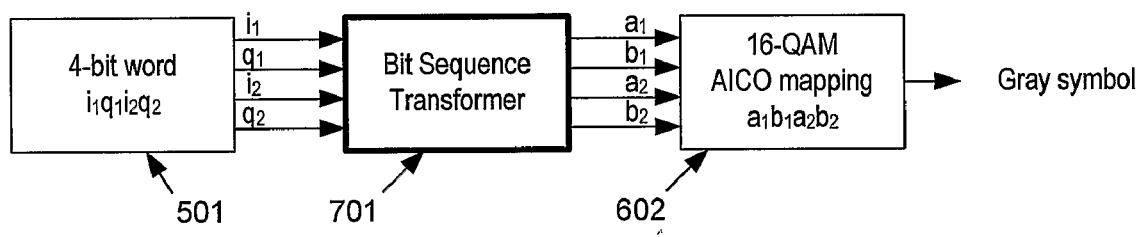
FIGS. 7 and 8 show exemplary structures of two different modulation units according to different embodiments of the invention.

In FIG. 7, the bit sequence transformer 701 transforms the data words provided by data source 501 to obtain a Gray symbol mapping using the AICO mapping unit 602. This is indicated by a change in the notation of the bits of the data words from $i_1 q_1 i_2 q_2$ to $a_1 b_1 a_2 b_2$. Similarly, in FIG. 8, the bit sequence transformer 801 transforms the data words provided by data source 501 to obtain an AICO symbol mapping using the Gray mapping unit 502.

Figure 8:
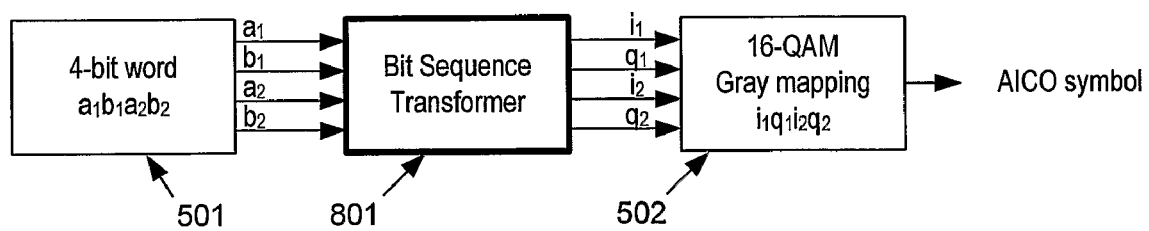
Figure 17:
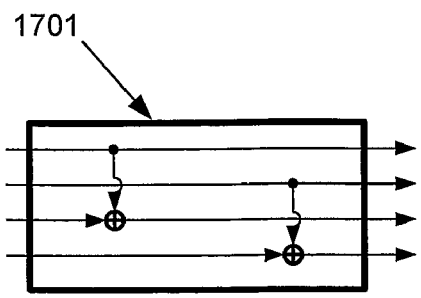
FIG. 17 shows a bit sequence transformation unit according to an exemplary embodiment of the invention.

The structure of a bit sequence transformer unit according to an exemplary embodiment of the invention and as used in FIG. 7 and/or FIG. 8 is shown in FIG. 17. The transformation of a the data words to obtain an AICO mapping using a Gray mapping unit 502 or to obtain a Gray mapping using an AICO mapping unit 602 is performed by performing XOR⊕operations.

If a conversion of source Gray sequences into target AICO sequences is desired, the following transformations of the bits of data words input to the bit sequence transformer unit 1701 are performed:

$$a_1 = i_1 \qquad \text{i)}$$

$$b_1 = q_1 \qquad \text{ii)}$$

$$a_2 = i_1 \oplus i_2 \qquad \text{iii)}$$

$$b_2 = q_1 \oplus q_2 \qquad \text{iv)}$$

Figure 18:
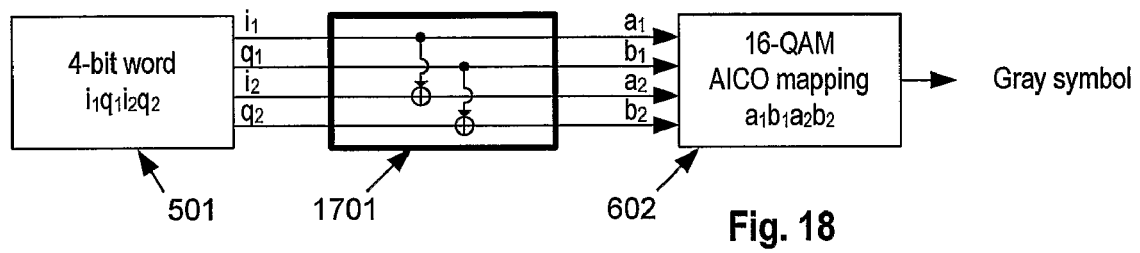
FIGS. 18 and 19 show the use of the bit sequence transformation unit in the structure of FIGS. 7 and 8 according to exemplary embodiments of the invention.

FIG. 18 shows a block diagram of a structure transforming an input Gray sequence of data words in the bit sequence transformer unit 1701 of FIG. 17 prior to modulation in an AICO symbol mapping unit 602. When mapping the transformed data words using the AICO symbol mapping unit 602, same outputs symbols according to the Gray symbol mapping scheme described above.

Figure 19:
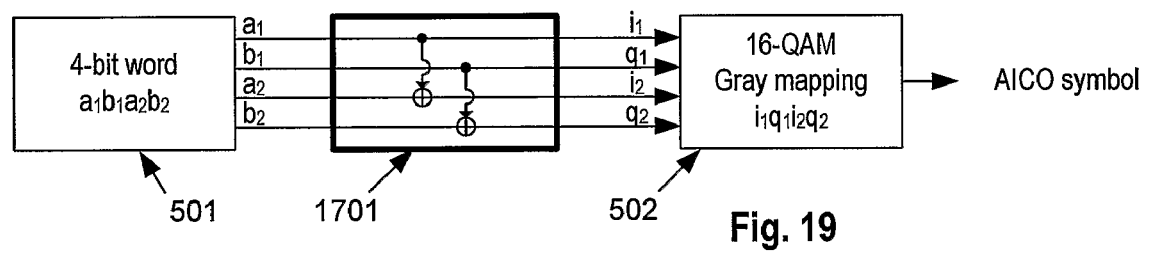

Conversely, the XOR operations ⊕ may also be used to convert source AICO bit sequences into target Gray sequences. In this latter case illustrated in FIG. 19, the bit sequence transformer unit 1701 may perform the following operations on the bits of a respective data word of the input AICO sequence:

$$i_1 = a_1 \qquad \text{v)}$$

$$q_1 = b_1 \qquad \text{vi)}$$

$$i_2 = a_1 \oplus a_2 \qquad \text{vii)}$$

$$q_2 = b_1 \oplus b_2 \qquad \text{viii)}$$

FIG. 9 to FIG. 12 show the selection of mapping regions of the individual bits $a_1 b_1 a_2 b_2$ depending on its logical value for AICO 16 QAM mapping, and FIG. 13 to 16 show the selection of mapping regions of the individual bits $i_1 q_1 i_2 q_2$ depending on its logical value for Gray 16 QAM mapping. Optionally, in each set of mapping rules the assignment of logical bit values to the respective mapping regions can be arbitrary for each bit. For simplicity it has been assumed so far that all dashed mapping regions denote a binary value of 1, and that all white mapping regions denote a binary value 0, for both the Gray and AICO mapping rules.

Figure 20:
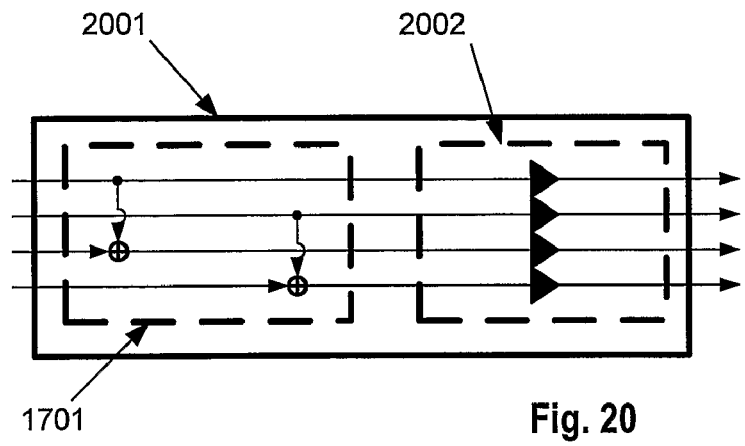
FIG. 20 shows another bit sequence transformation unit according to a further exemplary embodiment of the invention.
Figure 21:
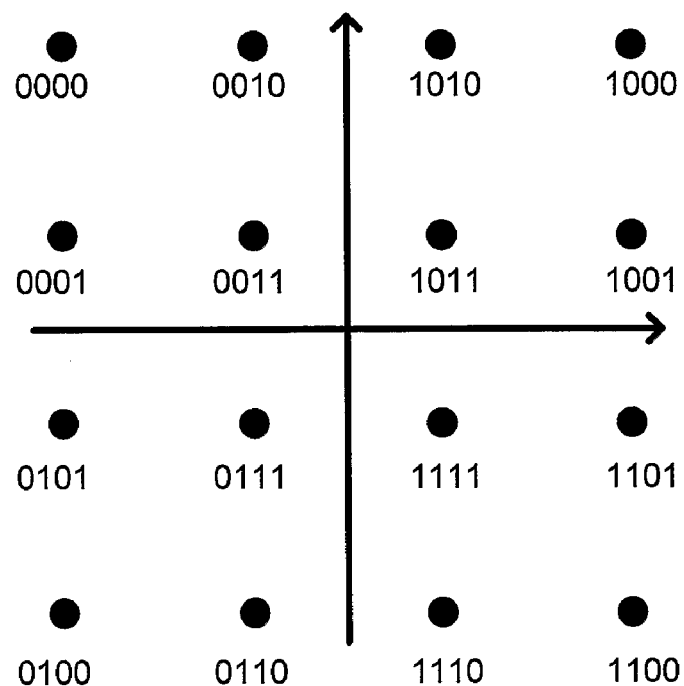
FIG. 21 shows an exemplary mapping of data words to modulation symbols of a 16 QAM constellation using a Gray mapping scheme.
Figure 22:
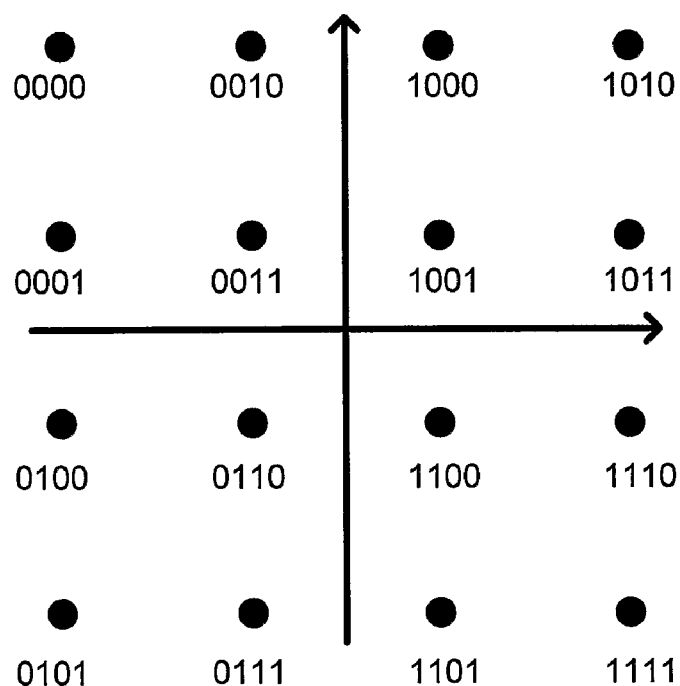
FIG. 22 shows an exemplary mapping of data words to modulation symbols of a 16 QAM constellation according to an embodiment of the invention using an AICO mapping scheme.

However, for each of those bits the relation may be negated individually without changing the mapping structure, that is if one or more regions from Gray mapping according FIG. 13 to FIG. 16 is negated the result is still a Gray mapping. Likewise if one or more regions from AICO mapping according to FIG. 9 to FIG. 12 is negated the result is still an AICO mapping. Therefore according to another embodiment of the invention binary negation operations are introduced. FIG. 20 shows another exemplary embodiment of a bit sequence transformer unit 2001 comprising the a bit sequence transformer 1701 of FIG. 17 an additional unit in which each bit may be optionally negated/inverted by inverters (see dashed box 2002 in FIG. 20).

Which particular bit has to be inverted depends on the relation between the mapping regions. For example, if the logical binary value 0 of a first bit selects the white vertical contiguous mapping region shown in FIG. 9 for AICO mapping and if the logical binary value 0 of a first bit selects the dashed horizontal contiguous mapping region shown in FIG. 13 for Gray mapping, the transformation of the data word within the bit sequence transformer unit 2001 may negate the bit $i_1$ (i.e. $\overline{i_1}=a_1$) for obtaining the desired mapping. Accordingly, the inverter inverting the respective bit selecting the vertical contiguous mapping region needs to be activated.

The general Gray or AICO properties are not changed, if any of the four constituent bits is inverted within the bit sequence transformer unit 2001. However, if a specific mapping at the output of the symbol mapping unit is desired, the inversions may be chosen accordingly.

It should be noted that the labels of the four input and output ports of the exemplary bit sequence transformer units have been omitted on purpose in FIGS. 17 and 20, as the particular labeling will depend on the particular mapping rules that are to be used for Gray and AICO symbols, as stated above.

A transmitting device, e.g. a mobile terminal or base station (Node B) in a mobile communication system, may comprise the exemplary structure shown in FIG. 17 through 20. If the transmitting device needs to transmit data mapped according to a Gray mapping scheme and/or an AICO mapping scheme for one or more communication methods, the transformation of the data words in the bit sequence transformer unit may be configured by the device. For example, if no transformation of the data words is desired control signals may be used to switch on/off the transformation of the bits within a data word, i.e. may control the execution of the XOR operations.

When considering the use of the invention in a mobile communication system such as UMTS, the configuration of the modulation and coding scheme to be used is commonly configured by radio resource control (RRC) functions and signaling. Therefore, another embodiment of the invention foresees that the bit sequence transformer unit in the transmitting device is configured according to RRC signaling. For example, in case the RRC signaling indicates to a transmitting device to use AICO mapping and the symbol mapping unit of the transmitting device uses Gray mapping, the transmitting device may control the bit sequence transformer unit to transform the data words prior to mapping as described above. Likewise, if RRC signaling indicates that the mapping scheme is to be changed between initial transmission of a packet data unit and a retransmission thereof in the RLC or HARQ protocol layer, the transmitting device may configure the bit sequence transformer unit accordingly. If an inversion of individual bits or all bits of a data word is required prior to or after transformation, the transmitting device may also control the inversion of the bits depending on the RRC signaling received.

Figure 23:
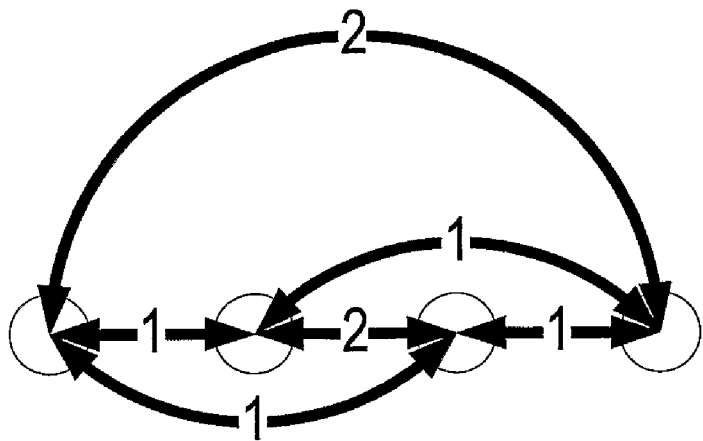
FIG. 23 shows a one-dimensional illustration of the Hamming distance properties of a 16 QAM constellation according to an embodiment of the invention using an AICO mapping scheme.
Figure 24:
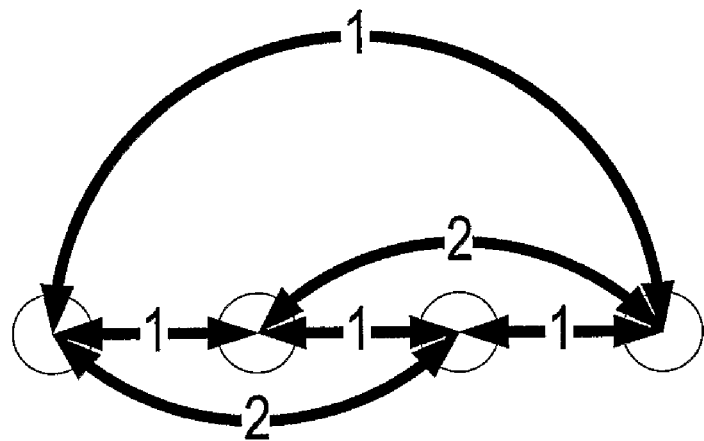
FIG. 24 shows a one-dimensional illustration of the Hamming distance properties of a 16 QAM constellation using a Gray mapping scheme.

In the following sections, the effects on the distribution of Hamming distances within the 16-QAM constellation implied by the transformation of the data words prior to symbol mapping will be discussed in more detail. FIG. 23 shows the Hamming distances regarding one dimension of an AICO mapping, i.e. the Hamming distances of modulations symbols in each row or column of the two dimensional complex signal space. FIG. 24 shows the Hamming distances regarding one dimension of a Gray mapping. Also in this figure, the Hamming distances of modulations symbols in each row or column of the two dimensional, complex signal space are illustrated. Those skilled in the art will appreciate that this is done for simplicity. These distance properties can easily be extended to the two-dimensional 16-QAM case by adding the Hamming and squared Euclidean distances for each dimension respectively.

As can be recognized from FIGS. 23 and 24, inter alia, the Hamming distances at the boundaries of the quadrants of the signal space (between the second and third symbol from the left) differ for Gray and AICO mapping.

In Gray mapping, the Hamming distance between nearest-neighbor symbols in the constellation is always one, while in AICO mapping the Hamming distance between modulation symbols at the boundaries of the quadrants of the signal space is 2. This leads two different properties of the bit error rate achieved by systems using AICO or Gray mapping as outlined in more detail in the copending international patent applications No. PCT/EP 2005/004891 and No. PCT/EP 2005/004892 already referred to previously.

In one embodiment of the invention, the change of the Hamming distance properties obtained by mapping using a Gray or AICO symbol mapping unit 502, 602 is achieved by the XOR operations transforming the source data words provided. It is important to notice that XOR operations performed on individual bits is only one exemplary example how to transform the data words. In contrast to the invention, the interleaving of the data prior to mapping does not allow for changing the Hamming distance characteristics of the symbol mapping, since a simple reordering of bits only results in a selection of a different mapping region within the same symbol mapping scheme.

The transformation of data words proposed by the invention changes individual bits of a respective data word and may also be used in combination with an interleaving step, depending on the symbol mapping scheme to be achieved and the symbol mapping unit used. For example, individual bits of a respective data word may be changed by logical operations as illustrated for exemplary purposes in FIG. 17 through 20.

In the embodiment described above, the use of a 16 QAM is assumed for exemplary purposes. More generally, it is to be noted that the (logical) combination of bits to be mapped to modulation symbols will change the Hamming distance properties of a first mapping into a second mapping with different Hamming distance properties. For example, using a Gray 64 QAM symbol mapping unit, the combination of 3 bits of a data word will change the Gray Hamming distance properties such that non-Gray mapping may be obtained using a Gray mapping unit.

Figure 9:
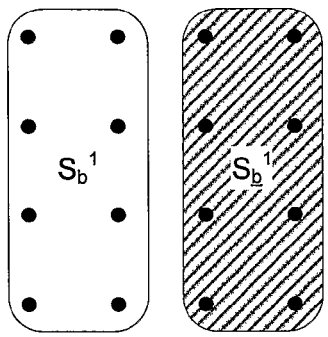
FIGS. 9 to 12 show the selection of mapping regions of individual bits of a data word according to an exemplary embodiment of the invention using an AICO mapping scheme.
Figure 13:
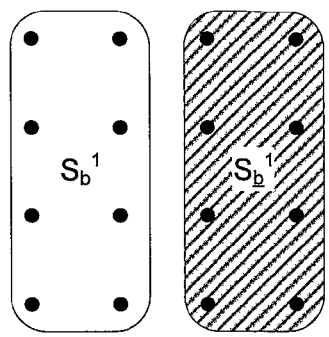
FIGS. 13 to 16 show the selection of mapping regions of individual bits of a data word using Gray mapping scheme.
Figure 10:
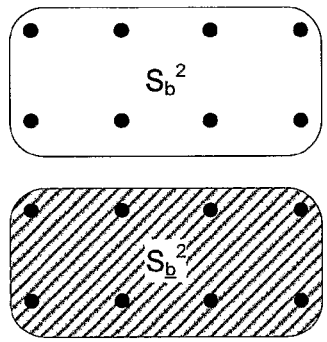
Figure 14:
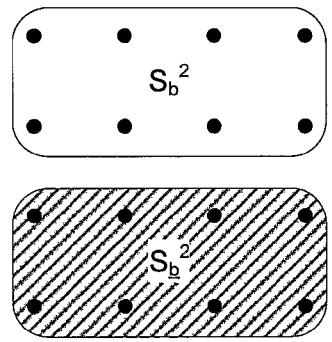
Figure 11:
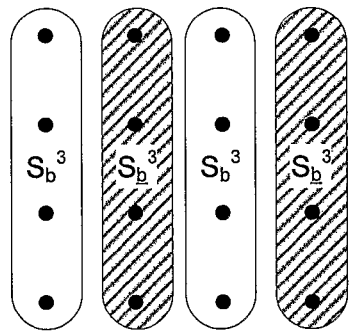

As already mentioned above, FIG. 9 to FIG. 12 show the selection of mapping regions of the individual bits $a_1 b_1 a_2 b_2$ depending on its logical value for AICO 16 QAM mapping, and FIG. 13 to 16 show the selection of mapping regions of the individual bits $i_1 q_1 i_2 q_2$ depending on its logical value for Gray 16 QAM mapping. The AICO symbol mapping scheme adheres the rules introduced previously in the introduction. These mapping rules may alternatively formulated as follows:

a first one of the four data bits of a data word representing a modulation symbol selects one of two horizontal contiguous symbol regions of the 16-QAM constellation based on its logical value, each of the two horizontal contiguous symbol regions being formed by two rows adjacent to each other, a second one of the four data bits of the data word representing the respective modulation symbol selects one of two vertical contiguous symbol regions of the 16-QAM constellation based on its logical value, each of the two vertical contiguous symbol regions being formed by two columns adjacent to each other, a third one of the four data bits of the data word representing the respective modulation symbol selects one of two horizontal non-contiguous symbol regions of the 16-QAM constellation based on its logical value, each of the two horizontal non-contiguous symbol regions being formed by two rows not adjacent to each other, a fourth one of the four data bits of the data word representing the respective modulation symbol selects one of two vertical non-contiguous symbol regions of the 16-QAM constellation based on its logical value, each of the two vertical non-contiguous symbol regions being formed by two columns not adjacent to each other, and Comparing FIG. 9 and FIG. 10 for AICO mapping with FIG. 13 and FIG. 14 for Gray mapping, one may note that for both Gray and AICO mapping the mapping regions selected by two out of four bits (for example, $a_1$ and $b_1$ or $i_1$ and $q_1$ respectively) are identical. The values of the logical bit $S_b^1$ ($a_1$ or $i_1$) and $S_b^2$ ($b_1$ or $q_1$) select one of the two vertically and horizontally contiguous regions defined by two neighboring columns/rows, respectively.

With respect to the remaining two bits $S_b^3$ and $S_b^4$ of a data word mapped to a modulation symbol ($a_2$ and $b_2$ or $i_2$ and $q_2$ respectively), it is noted that the mapping regions of a given logical bit value are not contiguous for both mapping schemes, but rather non-contiguous irrespective of the logical bit value as illustrated in FIGS. 11, 12, 15 and 16.

Figure 15:
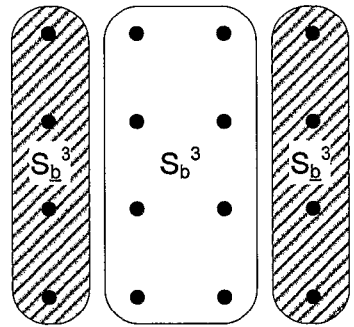
Figure 12:
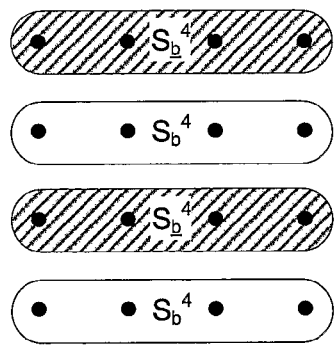
Figure 16:
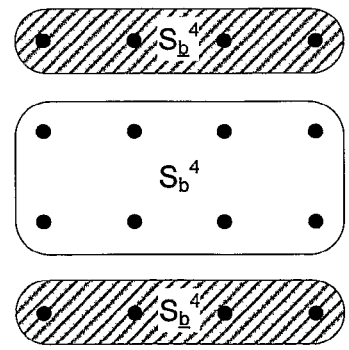

FIG. 15 and FIG. 16 show the mapping regions for the remaining two bits $S_b^3$ and $S_b^4$ according to Gray mapping rules. Here the mapping region for a first logical bit value is contiguous (shown in white background), while the region for a second logical bit value is non-contiguous (shown in dashed background). Furthermore the non-contiguous regions of AICO mapping illustrated in FIGS. 11 and 12—to which the bits $S_b^3$ and $S_b^4$ are mapped—are not identical to the non-contiguous regions of Gray mapping.

Comparing AICO mapping and Gray mapping, the following characteristics can be recognized:

Each mapping region selected by the logical value of a third bit in the data word encompasses eight signal points. Four of these eight signal points are within the same logical bit region in Gray and AICO mapping. In the example illustrated in FIG. 11 and FIG. 15 this is true for the two rightmost columns of four signal points each.

Moreover, four of these eight signal points are within different logical bit regions in Gray and AICO mapping. In the example illustrated in FIG. 11 and FIG. 15 this is true for the two leftmost columns of four signal points each If a data word is modulated according to a first set of mapping rules (either Gray or AICO) into one of the two rightmost columns, then no modification/transformation of the bit is necessary. However, if a data word is modulated according to a first set of mapping rules (either Gray or AICO) into one of the two leftmost columns, then the logical binary value of the third bit should be inverted.

This solution may be further improved by relating the inversion or non-inversion of the third bit to the logical bits value of the first bit (refer to FIG. 7). If the first bit selects the two rightmost columns, no operation is necessary; if the first bit selects the two leftmost columns, a binary inversion of the third bit is necessary.

This may be even further simplified using the binary exclusive-OR (XOR) operation. Assuming that the first bit of the source Gray sequence is denoted by $i_1$, the third bit of the source Gray sequence by $i_2$, and the third bit of the target AICO sequence by $a_2$ (compare FIG. 7), and that the mapping rules are defined such that in FIG. 9 to FIG. 15 a white background in the mapping regions represents a logical bit value of 0, and a dashed background represents a logical bit value of 1, then the following relations for $a_2$ and $b_2$ may be used:

$$a_2 = \overline{i_1} \oplus i_2 = i_1 \oplus \overline{i_2} = \overline{i_1 \oplus i_2} \qquad \text{ix)}$$

$$b_2 = \overline{q_1} \oplus q_2 = q_1 \oplus \overline{q_2} = \overline{q_1 \oplus q_2} \qquad \text{x)}$$

$$i_2 = \overline{a_1} \oplus a_2 = a_1 \oplus \overline{a_2} = \overline{a_1 \oplus a_2} \qquad \text{xi)}$$

$$q_2 = \overline{b_1} \oplus b_2 = b_1 \oplus \overline{b_2} = \overline{b_1 \oplus b_2} \qquad \text{xii)}$$

Accordingly, if other another modulation (e.g. of different order, different constellation, etc.) is used, the transformation of individual bits of a data word necessary may be determined based on an analysis of the mapping regions the individual bits in the two different mapping schemes select.

Figure 25:
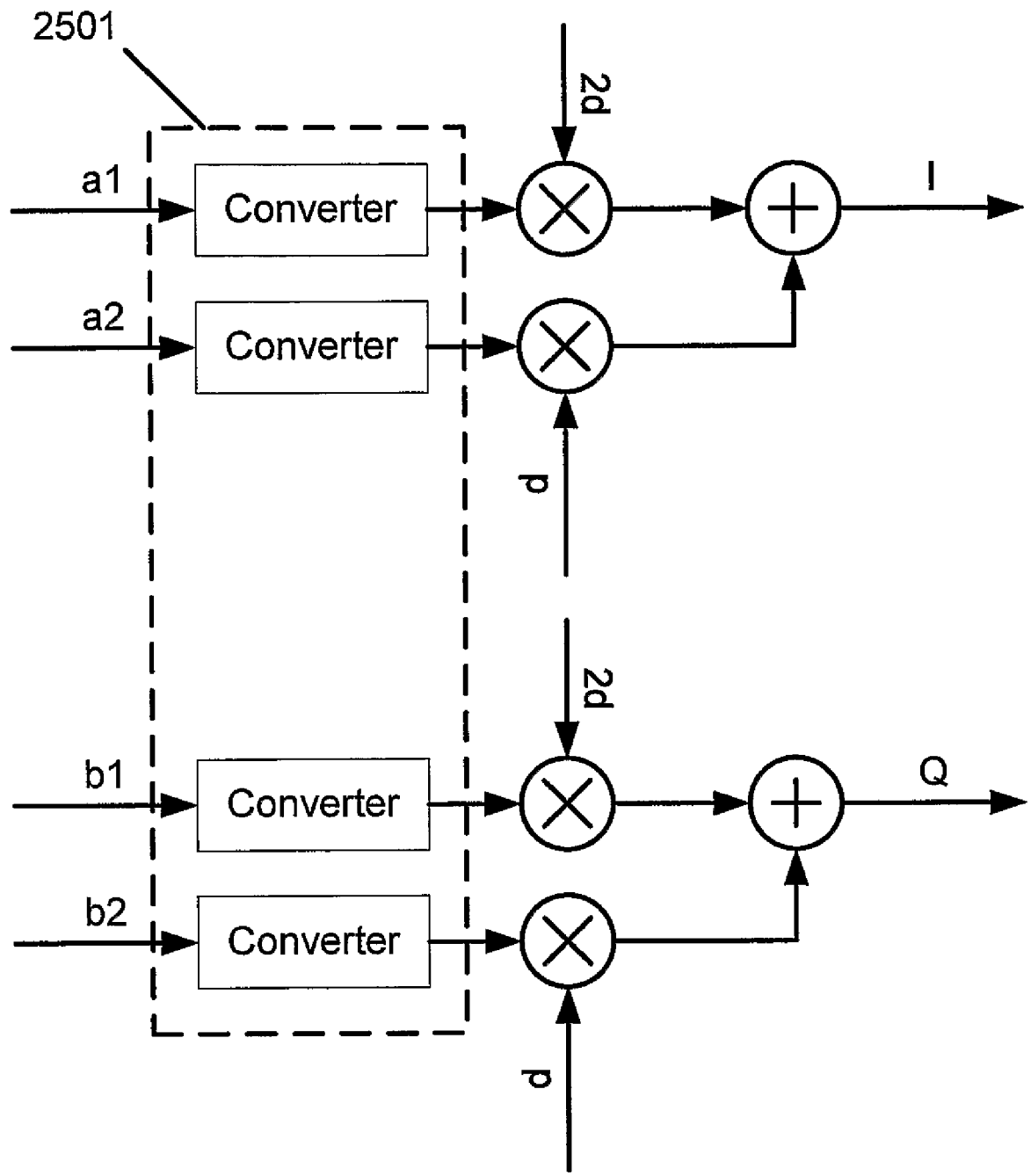
FIGS. 25 and 26 show two alternative structures for generating an AICO mapping according to different exemplary embodiments of the invention.

Another aspect of the invention is the generation of an AICO 16-QAM symbol constellation as for example illustrated in FIG. 25. In the following two alternative embodiments for generating an inphase and quadrature component of a signal selecting one of the 16 modulation symbols of the constellation will be outlined.

FIG. 25 shows an exemplary block structure for generating an AICO symbol mapping according to one embodiment of the invention. For a 16 QAM scheme, a data word consisting of a quadruple of bits selects one of the 16 modulation symbols according to the logical (binary) values of the quadruple of bits. For selecting a modulation symbol, the quadruple of bits is used to build inphase component and quadrature component of the signal used to transmit the four bit. The inphase and quadrature component thereby specify one of the modulation symbols of the constellation.

In one embodiment of the invention, it is assumed that the bits of the data words specify logical values, e.g. 0 and 1. In this case, the logical values are converted to numerical values in a converting section 2501—shown as four independent converters in FIG. 25—before mapping the data word to a modulation symbol.

As shown for exemplary purposes in FIG. 25 in conjunction with FIG. 9 to FIG. 12, the logical value of bit a1 (b1) of the data word selects either onto the positive half-plane or the negative half-plane of the inphase (quadrature) component of the modulation symbol selected to which the data word is mapped. Depending on the logical equivalence of a1 and a2 (b1 and b2), a data word is either mapped onto an outer column (row) or an inner column (row).

Figure 3:
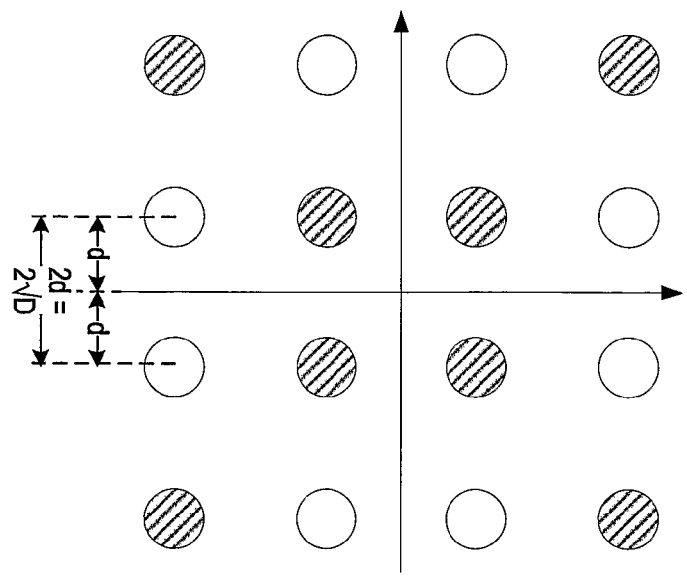
FIG. 3 shows the mapping of data words of even and odd Hamming weight to modulation symbols of a 16 QAM constellation according to an embodiment of the invention using an AICO mapping scheme.
Figure 4:
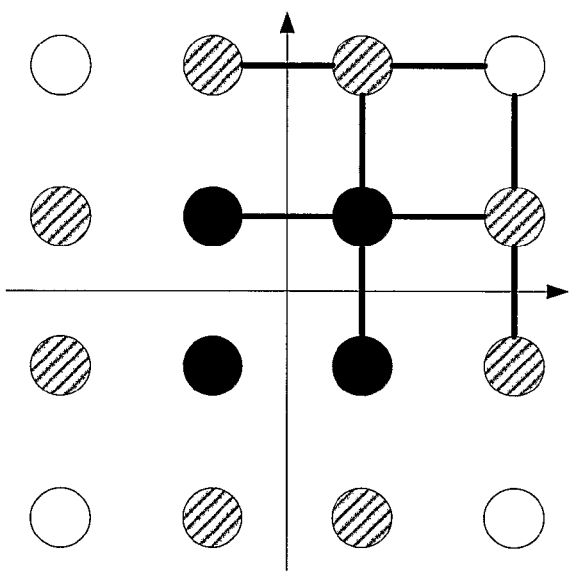
FIG. 4 shows nearest-neighbor relations of modulation symbols in a square 16 QAM constellation.
Figure 4:
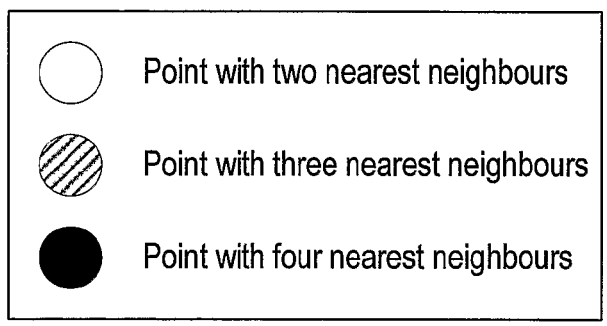

Therefore, bit a1 (b1) may be considered defining the sign, and the combination of bits a1 and a2 (b1 and b2) may be considered defining the absolute value of the inphase (quadrature) component of the modulation symbol. The sign of the respective signal component is either positive for a1=0, negative for a1=1 (or vice versa). Accordingly the absolute value of the component is either 3d for a1=a2 and 1d for a1≠a2 (or vice versa). This equally applies to the combination of bits b1 and b2. The value of d may correspond to one half of the minimum Euclidean distance between modulation symbols being nearest neighbors within the respective constellation used, as for example illustrated in FIG. 3. For example, the distance d may be chosen to be equivalent to $\sqrt{1/10}$.

In the upper part of the structure in FIG. 25, the numerical value of bit a1 is weighted with a first predetermined factor, selected according to the desired symbol constellation, and the numerical value of bit a2 is weighted with a second predetermined factor, selected according to the desired symbol constellation. To obtain a square 16 QAM constellation, the first factor may be equal to 2d and the second factor may be equal to d. Next, an adder adds the weighted numerical value of bit a1 to the weighted numerical value of bit a2. The resulting sum is the inphase component of the modulation symbol. The bits b1 and b2 are equally processed by the structural components shown in the lower part of FIG. 25 and form the quadrature component of the modulation symbol. As for the embodiment shown in FIG. 25, the structure allows for generating a symbol mapping according to the AICO mapping rules outlined previously herein.

The conversion unit converts a logical value to a numerical value. This may be for example implemented as follows: A logical value of 0 is converted into a numerical value of +1 and a logical value of 1 is converted into a numerical value of −1. It will be appreciated by those skilled in the art that the conversion rules and numerical values assigned to the respective binary logical values may be chosen according to the symbol constellation used or desired. Each of the four converters of the conversion unit may perform the conversion of the numerical values to the individual logical bits independently from the others.

The order of the bits a1 a2 b1 b2 within the data word is irrelevant for the generation of an AICO mapping. In the structure shown in FIG. 25 the bits a1 and b1 correspond to the bits selecting the contiguous mapping regions (compare with FIG. 9 and FIG. 10) while bits a2 and b2 correspond to the bits selecting the non-contiguous mapping regions (compare with FIG. 11 and FIG. 12). A superposition of the mapping regions selects one of the available modulation symbols.

Figure 26:
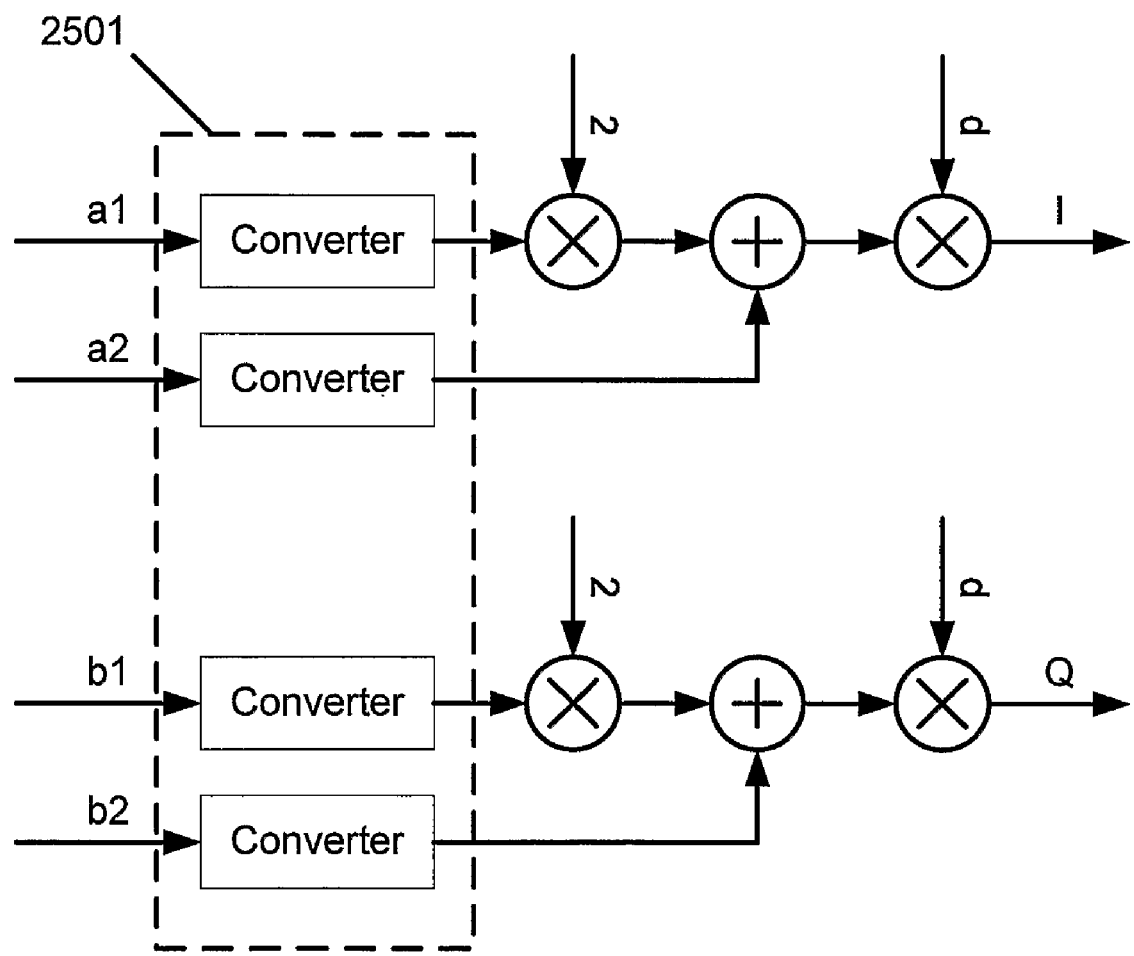

FIG. 26 shows a further, alternative block structure for generating an AICO symbol mapping according to another embodiment of the invention. As in the embodiment illustrated in FIG. 25, also in the embodiment according to FIG. 26 the bits of a data word are first converted from their binary logical values into numerical values by the converters of the conversion unit 2501, if necessary.

In the upper part of the structure, the numerical value of bit a1 is first weighted with a predetermined factor, selected according to the desired symbol constellation. To obtain a square 16 QAM constellation, the factor may be equal to 2. Next, an adder adds the weighted numerical value of bit a1 with the numerical value of bit a2. The sum is then weighted by the minimum Euclidean distance d, resulting in the inphase component of the modulation symbol. The bits b1 and b2 are equally processed by the structural components shown in the lower part of FIG. 26 and form the quadrature component of the modulation symbol. As for the embodiment shown in FIG. 25, the structure of FIG. 26 also allows for generating a symbol mapping according to the AICO mapping rules outlined previously herein.

It should be apparent to those skilled in the art that the step of conversion from logical values to numerical values is only necessary, if the data is available only in logical values prior to the procedures according to the present invention.

Another embodiment of the present invention relates to the implementation of the above described various embodiments using hardware and software. It is recognized that the various above mentioned methods as well as the various logical blocks or structures described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

For example, it is recognized that the bit sequence transformer unit for transforming the data words prior to mapping may be hardware implemented. Also the realization of bit sequence transformer unit may optionally include switches which allow for enabling or disabling the transformation prior to symbol mapping based on a control signal. Also the inverters for optionally inverting individual bits of the data words prior or after transformation by the bit sequence transformer unit may be implemented in hardware. Liekewise, with respect to the generation of an AICO mapping, it is noted that the adders and weighting elements in the exemplary structures of FIGS. 25 and 26 as well as all other structural elements may be implemented in hardware.

Further, the various embodiments of the present invention may also be implemented by means of software modules which are executed by a processor or directly in hardware. Also a combination of software modules and a hardware implementation may be possible. For example the functions performed by the bit sequence transformer unit may also be implemented by software modules. The software modules or instructions may be stored on any kind of computer readable storage media, for example RAM, EPROM, EEPROM, flash memory, registers, hard disks, CD-ROM, DVD, etc.

The invention claimed is:

1. A method for generating modulation symbols according to a second symbol mapping scheme by a symbol mapping unit being adapted to generate symbols according to a first symbol mapping scheme, wherein the first and second symbol mapping schemes define different mappings of data words of a stream to modulation symbols of a modulation scheme according to the respective symbol mapping scheme, the method comprising:

providing a stream of data words to a bit sequence transformer unit, wherein the number of bits of a data word is given by the order of the modulation scheme, transforming the data words by the bit sequence transformer unit to output a stream of transformed data words, and mapping the transformed data words of the stream to modulation symbols according to a first symbol mapping scheme by the symbol mapping unit, wherein the mapping of the transformed data words of the stream according to the first symbol mapping scheme results in modulation symbols according to the mapping of the data words of the provided stream prior to transformation according to the second symbol mapping scheme and wherein the first and the second symbol mapping scheme have different distributions with respect to the Hamming distance of data words representing nearest neighbors in a representation of the constellation of the modulation symbols of the modulation scheme.

2. The method according to claim 1, wherein transforming by the bit sequence transformer unit the sequence of the data words within the stream comprises performing at least one logical operation on at least one bit of each of the data words of the stream prior to mapping.

3. The method according to claim 2, wherein the at least one logical operation modifies the at least one bit of a respective data word to be mapped to a modulation symbol by combining the at least one bit of the respective data word with at least one other bit of the respective data word.

4. The method according to claim 3, wherein the combination is a XOR combination of the respective two bits.

5. The method according to claim 1, wherein the first and second symbol mapping schemes each define a mapping of data words of 4 bits to modulation symbols of a 16 Quadrature Amplitude Modulation (QAM) constellation.

6. The method according to claim 5, wherein the 16 QAM constellation has 16 modulation symbols representable in four rows and four columns in a complex coordinate plane, each modulation symbol of the 16 QAM constellations being representable by a data word being a combination of four data bits and wherein one of the two symbol mapping schemes is a symbol mapping scheme obeying the following mapping rules of data words to modulation symbols:

a first one of the four data bits of a data word representing a modulation symbol selects one of two horizontal contiguous symbol regions of the 16 QAM constellation based on its logical value, each of the two horizontal contiguous symbol regions being formed by two rows adjacent to each other, a second one of the four data bits of the data word representing the respective modulation symbol selects one of two vertical contiguous symbol regions of the 16 QAM constellation based on its logical value, each of the two vertical contiguous symbol regions being formed by two columns adjacent to each other, a third one of the four data bits of the data word representing the respective modulation symbol selects one of two horizontal non contiguous symbol regions of the 16 QAM constellation based on its logical value, each of the two horizontal non contiguous symbol regions being formed by two rows not adjacent to each other, a fourth one of the four data bits of the data word representing the respective modulation symbol selects one of two vertical non contiguous symbol regions of the 16 QAM constellation based on its logical value, each of the two vertical non contiguous symbol regions being formed by two columns not adjacent to each other, and wherein the other symbol mapping scheme is a Gray symbol mapping scheme.

7. The method according to claim 6, wherein when transforming the data words of the stream:

the bit in each data word of the provided stream selecting the horizontal non contiguous symbol region according to the second symbol mapping scheme is combined with the bit in the respective data word of the provided stream selecting the horizontal contiguous symbol region according to the second symbol mapping scheme, and the bit in each data word of the provided stream selecting the vertical non contiguous symbol region according to the second symbol mapping scheme is combined with the bit in the respective data word of the provided stream selecting the vertical contiguous symbol region according to the second symbol mapping scheme.

8. The method according to claim 6, wherein the Gray symbol mapping scheme obeys the following mapping rules of data words to modulation symbols:

a first one of the four data bits of a data word representing a modulation symbol selects one of two horizontal contiguous symbol regions of the 16 QAM constellation based on its logical value, each of the two horizontal contiguous symbol regions being formed by two rows adjacent to each other, a second one of the four data bits of the data word representing the respective modulation symbol selects one of two vertical contiguous symbol regions of the 16 QAM constellation based on its logical value, each of the two vertical contiguous symbol regions being formed by two columns adjacent to each other, a third one of the four data bits of the data word representing the respective modulation symbol selects one of two horizontal symbol regions of the 16 QAM constellation based on its logical value, wherein one of the two horizontal symbol regions is formed by two rows not adjacent to each other, and the other one of the two horizontal symbol regions is formed by two rows adjacent to each other, a fourth one of the four data bits of the data word representing the respective modulation symbol selects one of two vertical symbol regions of the 16 QAM constellation based on its logical value, wherein one of the two vertical symbol regions is formed by two columns not adjacent to each other, and the other one of the two vertical symbol regions is formed by two columns adjacent to each other, and wherein when transforming the data words of the stream:

the bit in each data word of the provided stream selecting the horizontal symbol region according to the second symbol mapping scheme is combined with the bit in the respective data word of the provided stream selecting the horizontal contiguous symbol region according to the second symbol mapping scheme, and the bit in each data word of the provided stream selecting the vertical symbol region according to the second symbol mapping scheme is combined with the bit in the respective data word of the provided stream selecting the vertical contiguous symbol region according to the second symbol mapping scheme.

9. The method according to claim 1, further comprising inverting the data bits of the provided or transformed data words prior to passing them to the symbol mapping unit.

10. A transmission apparatus for generating modulation symbols according to a second symbol mapping scheme by a symbol mapping unit being adapted to generate symbols according to a first symbol mapping scheme, wherein the first and second symbol mapping schemes define different mappings of data words of a stream to modulation symbols of a modulation scheme according to the respective symbol mapping scheme, the transmission apparatus comprising:

a data source adapted to provide a stream of data words to a bit sequence transformer unit, wherein the number of bits within a data word is given by the order of the modulation scheme, a processing unit adapted to transform the data words by the bit sequence transformer unit to output a stream of transformed data words, and the symbol mapping unit adapted to map the transformed data words of the stream to modulation symbols according to a first symbol mapping scheme, wherein the transmission apparatus is adapted to map of the transformed data words of the stream according to the first symbol mapping scheme results in modulation symbols according to the mapping of the data words of the provided stream according to the second mapping scheme and wherein the first and the second symbol mapping scheme have different distributions with respect to the Hamming distance of data words representing nearest neighbors in a representation of the constellation of the modulation symbols of the modulation scheme.

11. The apparatus according to claim 10, further comprising configuration unit adapted to configure the bit sequence transformer unit to transform or to not transform the provided data words prior to symbol mapping by the symbol mapping unit.

12. The apparatus according to claim 11, further comprising:

a receiver adapted to receive a control signal comprising information indicating whether to transform provided data words prior to symbol mapping by the symbol mapping unit, and wherein the configuration unit is adapted to configure the bit sequence transformer unit according to the information of the control signal.

13. A non-transitory computer readable medium storing instructions that, when executed by a processor of a transmission apparatus, cause the transmission apparatus to generate modulation symbols according to a second symbol mapping scheme, wherein the transmission apparatus comprises a symbol mapping unit being adapted to generate symbols according to a first symbol mapping scheme, wherein the first and second symbol mapping schemes define different mappings of data words of a stream to modulation symbols of a modulation scheme according to the respective symbol mapping scheme, by:

providing a stream of data words to a bit sequence transformer unit, wherein the number of bits within a data word is given by the order of the modulation scheme, transforming the data words by the bit sequence transformer unit to output a stream of transformed data words, and mapping the transformed data words of the stream to modulation symbols according to a first symbol mapping scheme by the symbol mapping unit, wherein the mapping of the transformed data words of the stream according to the first symbol mapping scheme results in modulation symbols according to the mapping of the data words of the provided stream according to the second symbol mapping scheme and wherein the first and the second symbol mapping scheme have different distributions with respect to the Hamming distance of data words representing nearest neighbors in a representation of the constellation of the modulation symbols of the modulation scheme.

14. A method for generating a mapping of data words to modulation symbols of a 16 Quadrature Amplitude Modulation (QAM) constellation, the modulation symbols being representable by an inphase component and quadrature component, the method comprising:

weighting the numerical value of a first one and the numerical value of a third one of the quadruple of bits with a first factor, weighting the numerical value of a second one and the numerical value of a fourth one of the quadruple of bits with a second factor, wherein the second factor is equal to two times the first factor, adding the weighted numerical value of the first one of the quadruple of bits and the weighted numerical value of the second one of the quadruple of bits, thereby forming the inphase component of a modulation symbol of the 16 QAM constellation and adding the weighted numerical value of the third one of the quadruple of bits and the weighted numerical value of the fourth one of the quadruple of hits, thereby forming the quadrature component of a modulation symbol of the 16 QAM constellation.

15. The method according to claim 14, wherein the first factor is equal to two times the minimum distance d between modulation symbols being nearest neighbors in the square 16 QAM constellation and the second factor is equal to the minimum distance d.

16. The method according to claim 14, further comprising converting each of a quadruple of bits from a logical value to a numerical value.

17. A method for generating a mapping of data words to modulation symbols of a 16 Quadrature Amplitude Modulation (QAM) constellation, the modulation symbols being representable by an inphase component and quadrature component, the method comprising:

weighting the numerical value of a first one and the numerical value of a third one of the quadruple of bits with a first factor, adding the weighted numerical value of the first one of the quadruple of bits and a numerical value of the second one of the quadruple of bits, and weighting the sum of the numerical values of the weighted first one and the second one of the quadruple of bits by a second factor, thereby forming the inphase component of a modulation symbol of the 16 QAM constellation, and adding the weighted numerical value of the third one of the quadruple of bits and a numerical value of a fourth one of the quadruple of bits, and weighting the sum of the numerical values of the weighted third one and the fourth one of the quadruple of bits by the second factor, thereby foaming the quadrature component of a modulation symbol of the 16 QAM constellation.

18. The method according to claim 17, wherein the first factor is equal to two and the second factor is equal to the minimum distance d between modulation symbols being nearest neighbors in the square 16 QAM constellation.

19. The method according to claim 17, further comprising converting each of a quadruple of bits from a logical value to a numerical value.

20. An apparatus for generating a mapping of data words to modulation symbols of a 16 Quadrature Amplitude Modulation (QAM) constellation, the modulation symbols being representable by an inphase component and quadrature component, the apparatus comprising:

a weighting unit adapted weight the numerical value of a first one and the numerical value of a third one of the quadruple of bits with a first factor, and for weighting the numerical value of a second one and the numerical value of a fourth one of the quadruple of bits with a second factor, wherein the first factor is equal to two times the second factor, and at least one adder adapted to add the weighted numerical value of the first one of the quadruple of bits and the weighted numerical value of the second one of the quadruple of bits, thereby forming the inphase component of a modulation symbol of the 16 QAM constellation, wherein the at least one adder is further adapted to add the weighted numerical value of the third one of the quadruple of bits and the weighted numerical value of the fourth one of the quadruple of bits, thereby forming the quadrature component of a modulation symbol of the 16 QAM constellation.

21. The apparatus according to claim 20, wherein the first factor is equal to two times the minimum distance d between modulation symbols being nearest neighbors in the square 16 QAM constellation and the second factor is equal to the minimum distance d.

22. An apparatus for generating a mapping of data words to modulation symbols of a 16 Quadrature Amplitude Modulation (QAM) constellation, the modulation symbols being representable by an inphase component and quadrature component, the apparatus comprising:

a weighting unit adapted to weight the numerical value of a first one and the numerical value of a third one of the quadruple of bits with a first factor, and at least one adder adapted to add the weighted numerical value of the first one of the quadruple of bits and a numerical value of the second one of the quadruple of bits, and weighting the sum of the numerical values of the weighted first one and the second one of the quadruple of bits by a second factor, thereby forming the inphase component of a modulation symbol of the 16 QAM constellation, wherein the at least one adder is further adapted to add the weighted numerical value of the third one of the quadruple of bits and a numerical value of a fourth one of the quadruple of bits, and weighting the sum of the numerical values of the weighted third one and the fourth one of the quadruple of bits by the second factor, thereby forming the quadrature component of a modulation symbol of the 16 QAM constellation.

23. The apparatus according to claim 22, wherein the first factor is equal to two and the second factor is equal to the minimum distance d between modulation symbols being nearest neighbors in the square 16 QAM constellation.

24. A non-transitory computer readable medium storing instructions that, when executed by a processor of a transmitting apparatus, causes the transmitting apparatus to generate a mapping of data words to modulation symbols of a square 16 Quadrature Amplitude Modulation (QAM) constellation, the modulation symbols being representable by an inphase component and quadrature component, by:
  weighting the numerical value of a first one and the numerical value of a third one of the quadruple of bits with a first factor,
  weighting the numerical value of a second one and the numerical value of a fourth one of the quadruple of bits with a second factor, wherein the first factor is equal to two times the second factor,
  adding the weighted numerical value of the first one of the quadruple of bits and the weighted numerical value of the second one of the quadruple of bits, thereby forming the inphase component of a modulation symbol of the square 16 QAM constellation and
  adding the weighted numerical value of the third one of the quadruple of bits and the weighted numerical value of the fourth one of the quadruple of bits, thereby forming the quadrature component of a modulation symbol of the square 16 QAM constellation.

25. A non-transitory computer readable medium storing instructions that, when executed by a processor of a transmitting apparatus, causes the transmitting apparatus to generate a mapping of data words to modulation symbols of a 16 Quadrature Amplitude Modulation (QAM) constellation, the modulation symbols being representable by an inphase component and quadrature component, by:
  weighting the numerical value of a first one and the numerical value of a third one of the quadruple of bits with a first factor,
  adding the weighted numerical value of the first one of the quadruple of bits and a numerical value of the second one of the quadruple of bits, and weighting the sum of the numerical values of the weighted first one and the second one of the quadruple of bits by a second factor, thereby forming the inphase component of a modulation symbol of the 16 QAM constellation, and
  adding the weighted numerical value of the third one of the quadruple of bits and a numerical value of a fourth one of the quadruple of bits, and weighting the sum of the numerical values of the weighted third one and the fourth one of the quadruple of bits by the second factor, thereby forming the quadrature component of a modulation symbol of the 16 QAM constellation.

* * * * *